United States Patent [19]

Rokhvarg

[11] Patent Number: 5,502,630
[45] Date of Patent: Mar. 26, 1996

[54] POWER FACTOR CORRECTED RECTIFICATION

[75] Inventor: Alexander Rokhvarg, Cliffside Park, N.J.

[73] Assignee: Transistor Devices, Inc., Cedar Knolls, N.J.

[21] Appl. No.: 277,500

[22] Filed: Jul. 19, 1994

[51] Int. Cl.$^6$ .................................................. H02M 7/21
[52] U.S. Cl. ............................ 363/84; 363/89; 323/222
[58] Field of Search ............................ 363/67, 68, 69, 363/84, 87, 89, 44; 323/207, 220, 222

[56] References Cited

U.S. PATENT DOCUMENTS

| | | | |
|---|---|---|---|
| 2,999,970 | 9/1961 | Schwesig et al. | 321/27 |
| 3,215,925 | 11/1965 | Reike | 323/63 |
| 3,223,915 | 12/1965 | Ryerson et al. | 321/18 |
| 3,284,692 | 11/1966 | Gautherin | 321/16 |
| 3,746,967 | 7/1973 | Koltuniak et al. | 321/5 |
| 3,796,941 | 3/1974 | Danz et al. | 321/5 |
| 3,845,374 | 10/1974 | Clarady et al. | 318/445 |
| 3,889,176 | 6/1975 | Randall | 323/8 |
| 4,224,662 | 9/1980 | Boniger | 363/87 |
| 4,471,855 | 9/1984 | Nomura | 187/29 |
| 4,533,986 | 8/1985 | Jones | 363/17 |
| 4,672,526 | 6/1987 | Mehnert et al. | 363/69 |
| 4,677,366 | 6/1987 | Wilkinson et al. | 323/222 |
| 4,831,508 | 5/1989 | Hunter | 363/44 |
| 4,940,929 | 6/1990 | Williams | 323/222 |
| 5,003,454 | 3/1991 | Bruning | 363/81 |
| 5,059,887 | 10/1991 | Iida et al. | 323/222 |
| 5,119,283 | 6/1992 | Steigerwald et al. | 363/37 |
| 5,181,159 | 1/1993 | Peterson et al. | 363/89 |
| 5,224,025 | 6/1993 | Divan et al. | 363/16 |
| 5,373,195 | 12/1994 | De Doncker et al. | 307/45 |
| 5,383,109 | 1/1995 | Maksimovic et al. | 323/222 |

OTHER PUBLICATIONS

A New Zero–Voltage Transistion, Three Phase PWM Rectifier/Inverter Circuit, V. Vlatkovic, D. Borojevic, F. C. Lee, C. Cuadros, and S. Gataric, Virginia Power Electronics Center, T–1–T–6.

A New Control Algorithm for Three–Phase PWM Buck Rectifier with Input Displacement Factor Compensation, S. Hiti, V. Vlatkovic, D. Borojevic and F. C. Lee, Virginia Power Electronics Center, pp. 19–25.

A conceptually new high frequency switched mode power amplifier technique eliminates current ripple. Cuk et al. pp. G3–1 to G3–22 May 1978 Fifth National Solid State Power Convrsion Conference, San Francisco, CA.

Primary Examiner—Peter S. Wong
Assistant Examiner—Adolf Berhane
Attorney, Agent, or Firm—Thomas L. Adams

[57] ABSTRACT

A power supply is adapted to be connected to single or multiple phase power lines providing alternating current, for delivering power to a load. The supply has an energy storage device for storing and then delivering electrical energy to the load. An inductive system is adapted to be coupled to the power lines for inductively storing and discharging energy. A switching system is coupled to the inductive system for switching a flow of bidirectional current through the inductive system to alternately (a) store energy in the inductive system from the power lines and (b) convey energy from the inductive system and the power main to the energy storage device. Also included is a controller coupled to the switching system for operating it at a repetition rate exceeding that of half cycles of the power lines. The supply also includes a unidirectional conducting system having a pair of unidirectional conducting paths coupled between the inductive system and the energy storage device for steering bidirectional current from the inductive system to provide a unipolar potential at the energy storage device. The preferred embodiment shapes the line current waveform from the power lines into a sinusoid that is in phase with the voltage of the power lines to improve the power factor and reduce harmonic distortion. The preferred supply can produce a D.C. output that is regulated to be independent of line or load variations.

47 Claims, 5 Drawing Sheets

POWER FACTOR CORRECTED RECTIFICATION

BACKGROUND OF THE INVENTION

1. Field of the Invention

The present invention relates to power supplies employing inductive systems and high frequency switches to regulate an output voltage and to improve the power factor.

2. Description of Related Art

Alternating current from a power line can be rectified through a full wave bridge to charge a capacitor. This simple rectifier will draw bursts of current around the voltage peak of the power line. This distorts the line current, creating high instantaneous demands and harmonic distortion. The line current can be further disturbed by reactive loads or other factors, which cause a phase shift between the current and voltage on the power line. The disparity between the line voltage and current is disadvantageous and much work has been done in this field under the heading of power factor correction.

Known voltage doubler circuits use a serially connected pair of capacitors whose common terminal is connected to one side of a power line. The other side of the power line connects through oppositely poled rectifiers to the non-common terminals of the different capacitors. Constructed in this simple fashion, a voltage doubler has no regulation and also draws current pulses in a way that will degrade its power factor.

Figure 1:
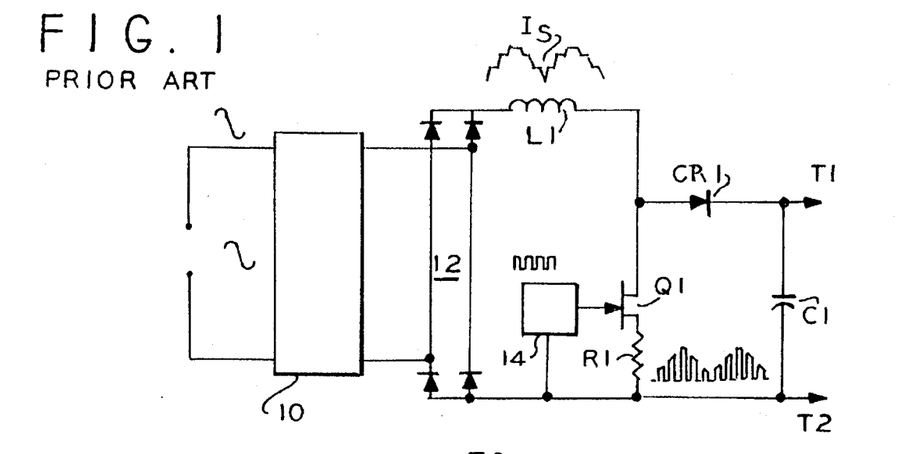
FIG. 1 is a schematic diagram of a supply in accordance with the prior art.

The prior art power supply of FIG. 1 feeds a full wave bridge 12 through an electromagnetic interference filter 10. The rest of the circuit is an "up-pulser." That circuit is essentially a boost converter having an inductor L1 serially connected with a rectifier CR1 to charge output capacitor C1 at output terminals T1, T2. A high frequency switching transistor Q1 is connected from the junction of inductor L1 and diode CR1 through a series resistor R1 to output terminal T2. When the transistor Q1 conducts, current flows from the full wave bridge through inductor L1 to return terminal T2, to build a magnetic field in inductor L1. When transistor Q1 later stops conducting, the voltage across inductor L1 reverses and the current through inductor L1 continues to flow in the same direction, but now through rectifier CR1 to charge capacitor C1. Capacitor C1 is charged to a higher potential than the peak voltage from the full wave bridge 12.

Significantly, the current through inductor L1 is uninterrupted. The current waveform $I_s$ ramps up and down stepwise (for simplicity, an uncharacteristically small number of steps are shown). Thus, the current waveform $I_s$ will have small, high frequency perturbations that can be easily removed by filtering. This scheme avoids the high energy harmonics caused by periodically interrupting the current to drop it from a peak value to zero.

A disadvantage with this configuration is that terminals T1 and T2 do not constitute stable reference potentials. For example, terminal T2 is connected through bridge 12 alternatively, to either the high or the low line of the power main. This changing reference potential tends to introduce electromagnetic interference with any load connected to terminals T1 and T2. In addition, in systems employing three phase power, the power supply of FIG. 1 cannot be simply replicated three times, because their outputs cannot be tied directly together without isolating transformers or the like.

See also U.S. Pat. No. 3,215,925 for an early implementation of this type of system. Similar systems are shown in U.S. Pat. Nos. 4,677,366 and 4,940,929. Other power circuits of lesser relevance are shown in U.S. Pat. Nos. 2,999,970; 3,223,915; 3,284,692; 3,746,967; 3,796,941; 3,845,374; 3,889,176; 4,224,662; 4,471,855; 4,672,526; and 5,119,283.

Control circuit 14 of FIG. 1 may employ known integrated circuits. For example, a Unitrode high power factor preregulator, model number UC1854, can produce a chopping frequency of, for example, 55 kHz. This known circuit can respond to various feedback signals: the instantaneous current and voltage from full wave bridge 12, the output voltage across capacitor C1, and the RMS value of the voltage from bridge 12 (estimated with a second order filter, for example). This system compares the voltage across capacitor C1 to an internal standard and then this difference is (a) is multiplied by the instantaneous output voltage of bridge 12 (b) and divided by the square of the RMS value of that voltage. This factor is then compared in an error loop to the instantaneous current from bridge 12 to regulate the duty cycle of transistor Q1.

The output voltage across capacitor C1 is regulated by regulating the average duty cycle of transistor Q1. The instantaneous bridge current is regulated by regulating the instantaneous duty cycle of transistor switch Q1. By adjusting this instantaneous duty cycle, the magnitude of current and voltage at the power main can be kept in phase and, for constant loads, proportional. This relationship avoids current surges and harmonics and improves the effective power factor of the supply as seen by the power lines.

U.S. Pat. No. 4,831,508 shows in FIG. 12 a boost regulator employing an inductor carrying bidirectional current and a bidirectional shunt switch, both feeding a full wave bridge to charge a pair of serially connected capacitors. The center tap between the capacitors is connected either directly to neutral or to the center tap of a transformer connected across the power line.

The shunt switch operates at a low frequency with a switching cycle that repeats only once per half cycle of the power line. Thus this system will produce relatively high harmonic components. Also, because the output voltage is supplied from a full wave bridge, the high and low output terminals will be alternately referred to neutral. Thus this output will have a relatively unstable high potential, which tends to produce electromagnetic interference, and to impede direct connection (without isolation) when multiple phases are employed.

U.S. Pat. No. 5,224,025 shows in FIG. 1 a full wave bridge charging a capacitor through a serially connected inductor and rectifier whose junction is shunted through a transistor switch. This capacitor is not the power output and this configuration has many of the disadvantages noted above.

Known systems have employed the six step, pulse width modulation (PWM) control technique (also known as space vector modulation). For example, a three phase PWM boost rectifier can employ three inductors separately connected to each phase of a power main. The output terminal of each inductor is connected by two switches to either end of a common output capacitor. Each switch has a shunting rectifier connected in parallel across it. See V. Vlatkovic, D. Borojevic, F. C. Lee, C. Cuadros, and S. Gataric, A New Zero-Voltage Transition, Three Phase PWM Rectifier/Inverter Circuit, Virginia Power Electronics Center (published 9/93, but not necessarily prior art). For a three-phase buck rectifier, see S. Hiti, V. Vlatkovic, D. Borojevic, and F. C. Lee, A New Control Algorithm for Three-Phase PWM Buck Rectifier with Input Displacement Factor Compensation, Virginia Power Electronics Center (published 9/93, but not necessarily prior art).

Accordingly, there is a need for an improved rectifier for supplying regulated voltage from single or multiple phase power lines while shaping the line current waveform to improve the power factor and to reduce harmonic distortion.

SUMMARY OF THE INVENTION

In accordance with the illustrative embodiments demonstrating features and advantages of the present invention, there is provided a power supply adapted to be connected to a power main providing alternating current, for delivering power to a load. The supply includes an energy output means for conveying electrical energy to the load. Also included is an inductive means adapted to be coupled to the power main for inductively storing and discharging energy. The supply also includes a unidirectional means having a pair of unidirectional conducting paths coupled between the inductive means and the energy output means for steering bidirectional current from the inductive means to provide a unipolar potential at the energy output means. A switching means is coupled to the inductive means (a) for branching away from the pair of unidirectional conducting paths, and (b) for switching a flow of bidirectional current through the inductive means to alternately (i) store energy from the power main in the inductive means, and (ii) convey energy from the inductive means and the power main to the energy output means. The supply also includes a control means coupled to the switching means for operating it at a repetition rate exceeding that of half cycles of the power main.

According to another aspect of the present invention a power supply working with the above load and power main employs a pair of capacitive devices. These capacitive devices are serially connected across a pair of output terminals and connected together at a common terminal for storing and conveying electrical energy to the load. An inductive means is adapted to be coupled to the power main for inductively storing and discharging energy. This supply also includes a pair of unidirectional conducting devices, each connected from a different corresponding one of the output terminals to the inductive means. Also included is a switching means coupled to the inductive means and being connected between the common terminal and the inductive means. As before, a control means is coupled to the switching means for operating it at a repetition rate exceeding that of half cycles of the power main.

According to another aspect of the present invention a power supply is adapted to be connected to a power main having multiple phases, for delivering power to a load. The supply has a pair of capacitive devices serially connected across a pair of output terminals and connected together at a common terminal for storing and conveying electrical energy to the load. Multiple phases are accommodated by employing a plurality of inductive devices, one for each of the multiple phases of the power main. Each of the inductive devices are adapted to be separately coupled to a corresponding one of the multiple phases of the power main for inductively storing and discharging energy. Also included are a plurality of pairs of unidirectional conducting devices, one pair for each of the multiple phases of the power main. Each of the unidirectional conducting devices of each pair is connected from one of the output terminals to an associated one of the inductive devices. The supply also has a plurality of switching devices, one for each of the multiple phases of the power main. Each of the switching devices is coupled from the common terminal to an affiliated one of the inductive devices. Also included is a control means coupled to each of the switching devices for operating them at a repetition rate exceeding that of half cycles of the power main.

By employing such arrangements, improved power rectification is achieved. A preferred supply can shape the line current waveform into a sinusoid proportional to line voltage, to improve power factor and reduce harmonic distortion. Also the preferred supply can regulate the D.C. (direct current) output from a rectifier, independent of line or load variation. Moreover, the system can store energy in the D.C. output, which may be utilized for "hold up" during line transients.

In a preferred embodiment, a D.C. voltage is applied across serially connected capacitors. The center connection of the capacitors is maintained at a constant potential, equivalent to an artificial neutral. A preferred building block of this supply employs a boost circuit using an inductor serially connected with the power line and shunted by a high frequency switch. The switch and inductor carry bidirectional current. When the switch is open, current from the inductor can flow through alternate rectifiers to either the positive or negative output terminal of the serially connected capacitors. Because the inductor is driven without interrupting its current, the current drawn from the power lines is relatively smooth (subject to ripple caused by switching transients). Moreover, this topology allows the output capacitors to be charged to a potential that is relatively stable with respect to neutral (or to the average voltage associated with one of the high power lines).

This basic building block can be replicated for use in three phase systems. The currents may be kept in phase with and proportional to their voltages, so that the power factor of the supply is relatively high. Also, each block associated with each phase produces a voltage which can be connected together at common output terminals without the need for an intervening isolating transformer.

In addition, the potential at the terminal between the two serial output capacitors remains at a relatively stable, neutral voltage, but need not be connected to a neutral power line. Thus the supply can be powered from lines in either a wye or delta configuration.

BRIEF DESCRIPTION OF THE DRAWINGS

The above brief description as well as other objects, features and advantages of the present invention will be more fully appreciated by reference to the following detailed description of the presently preferred but nonetheless illustrative embodiments in accordance with the present invention when taken in conjunction with the accompanying drawings wherein.

DETAILED DESCRIPTION OF THE PREFERRED EMBODIMENTS

Figure 2:
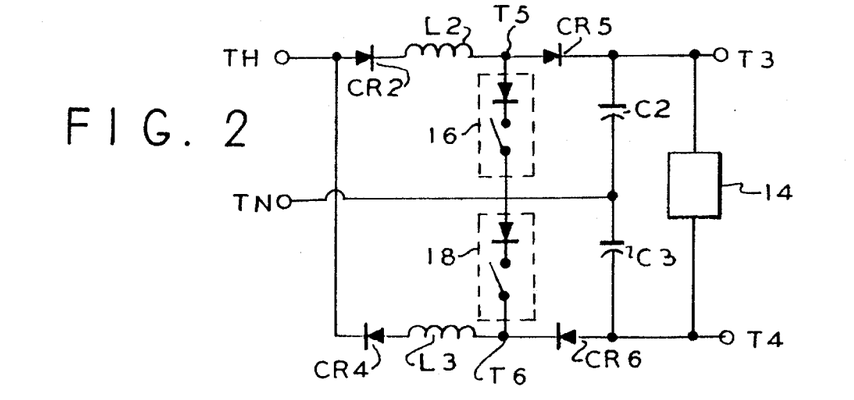
FIG. 2 is a schematic diagram of a power supply in accordance with the principles of the present invention.

Referring to FIG. 2, the illustrated power supply connects to a power main through terminals TH and TN, which may be a high terminal and neutral terminal, respectively. An inductive means is illustrated herein as a pair of inductive devices L2 and L3, shown connected to support a bidirectional current. Inductor L2 is connected between inductor terminal T5 and the cathode of rectifier CR2, whose anode is connected to terminal TH. Inductor L3 is connected between inductor terminal T6 and the anode of rectifier CR4, whose cathode is also connected to terminal TH.

A pair of unidirectional conducting devices (also referred to as a unidirectional means) are shown herein as rectifiers CR5 and CR6, connected to provide a pair of unidirectional conducting paths. The anode of rectifier CR5 is connected to terminal T5 and its cathode is connected to output terminal T3. The cathode of rectifier CR6 is connected to terminal T6 and its anode to terminal T4.

An energy output means is shown herein as a pair of capacitive devices C2 and C3 which are serially connected together at common terminal TN and across output terminals T3 and T4 (in parallel with load 14).

A switching means and control means is shown herein employing a pair of switching devices 16 and 18, which are commonly connected to common terminal TN and branch to separately connect to terminals T5 and T6, respectively. Switching devices 16 and 18 are shown as a serial combination of a switch and diode, but in practical embodiments the circuit will be more involved, as described hereinafter.

In operation, either inductor L2 or L3 will conduct, depending upon the polarity at power line TH. For example, during positive polarity, rectifier CR2 is forward biased to apply a current through inductor L2. Switching devices 16 and 18 close periodically and at a high frequency (for example, 20 kHz). When switching device 16 is closed, the voltage across power lines TH, TN is applied across inductor L2, to increase its current and the energy in its magnetic field (at least during the beginning of a half cycle of the power line). When switching device 16 subsequently opens, the polarity on inductor L2 reverses and current flows through rectifier CR5 to charge capacitor C2.

For the opposite polarity of power lines TH/TN, inductor L2 will be operative and can have energy supplied to it when switching device 18 closes. When switching device 18 opens, inductor L3 can supply current through rectifier CR6 to negatively charge capacitor C3 with respect to terminal TN.

As described further hereinafter, the average duty cycle of switching devices 16 and 18 can be adjusted to regulate the voltage across terminals T3 and T4. Also, the instantaneous duty cycle can be adjusted to draw current from terminal TH that is substantially proportional to and in phase with the voltage across terminals TH, TN.

Figure 3:
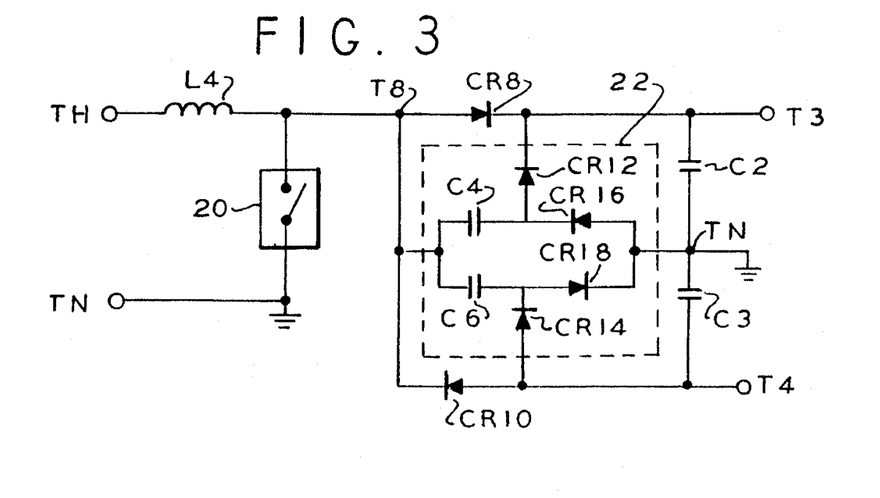
FIG. 3 is a schematic diagram of a power supply which is a simplified alternate to that of FIG. 2 but including an optional power balancing circuit.

FIG. 3 is a simplified version of the circuit of FIG. 2. Similar terminals having the same purpose have the same reference numerals. In this embodiment, instead of a pair of inductive devices, a single inductive device L4 for carrying a bidirectional current is shown connected between terminals TH and T8 (terminal T8 is also referred to as the common one of the inductor terminals).

Instead of a pair of switching devices, a single switching device 20 is illustrated herein, connected between terminals T8 and TN. A pair of unidirectional conducting devices are shown herein as rectifiers CR8 and CR10, which are connected by their anode and cathode, respectively, to terminal T8. The cathode of rectifier CR8 is connected to terminal T3, while the anode of rectifier CR10 is connected to terminal T4. Previously mentioned capacitors C2 and C3 are again connected in series between output terminals T3 and T4, with their common terminal connected to terminal TN.

A balancing means is shown herein as steering circuit 22 employing a pair of capacitors C4 and C6, each having one terminal connected to terminal T8, their other terminals being separately connected to the anode of diode CR12 and the cathode of diode CR14. The cathode of diode CR12 and the anode of CR14 are connected to terminals T3 and T4, respectively. The anode of diode CR16 and the cathode of diode CR18 are both connected to common terminal TN. The cathode of diode CR16 is connected to the anode of diode CR12 and the anode of diode CR18 is connected to the cathode of diode CR14. A balancing means of this type ought to be incorporated in the circuit of FIG. 2 to accomplish the balancing described hereinafter.

The circuit of FIG. 3 operates similarly to that of FIG. 2, but with fewer switches and inductors. Specifically, switch 20 can close periodically at a high frequency. When closed, the voltage across power lines TH and TN can increase the current and magnetic energy in inductor L4 (at least when the magnitude of line voltage is increasing). When switch 20 opens, the polarity of inductor L4 reverses and supplies current at a boosted voltage to terminal T8. Since the current through inductor L4 is bidirectional, this current will flow through either rectifier CR8 or CR10 depending upon its polarity. Positive currents will flow through rectifier CR8 to charge capacitor C2 while negative currents will flow through rectifier CR10 to charge capacitor C3.

As before, the average duty cycle of switch 20 can be adjusted to regulate the D.C. potential across output terminals T3 and T4. Furthermore, the instantaneous duty cycle of switching device 20 can be adjusted to keep the line current and line voltage substantially proportional and in phase. Maintaining this relationship ensures that the supply has a relatively high power factor and avoids harmonic distortions.

The charge on the capacitors C2, C3 can become unbalanced because of switch efficiency imbalance and control circuitry offsets. If left uncorrected, the capacitors' equilibrium state is undefined and one of the capacitors can be fully charged with the other almost 10 discharged. For this purpose, balancing means 22 operates to provide a charging current to both capacitors, regardless of the power cycle.

For example if the voltage on capacitor C2 is greater than that of capacitor C3 during a positive half cycle when switch 20 is open, rectifiers CR8 and CR18 are both forward biased, which causes capacitor C6 to charge to a potential approximately the same as that of capacitor C2. When switching device 20 closes so the potential at terminal T8 equals that at terminal TN, rectifier CR18 is reversed biased and capacitor C6 can discharge through rectifier CR14 to negatively charge capacitor C3. Thus during this positive half cycle of power, capacitor C2 can be charged when switch 20 is open while capacitor C3 can be similarly charged when switching device 20 closes. For negative halves of the power cycle in case the voltage on capacitor C3 exceeds that of capacitor C2, capacitor C4 takes the role previously played by capacitor C6 to positively charge capacitors C2 when switching device 20 closes, since balancing means 20 is symmetrical.

Figure 4:
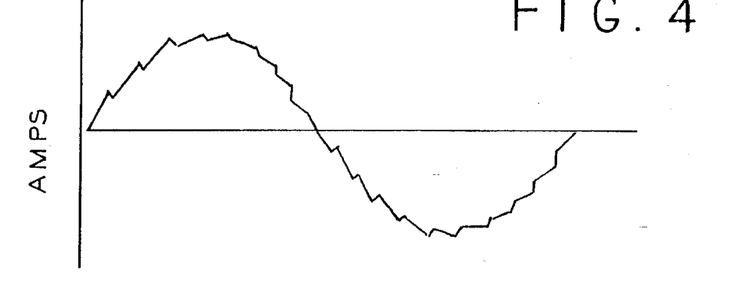
FIG. 4 is an illustration of a current waveform associated with the circuits of FIGS. 2 and 3.

Throughout the foregoing, the current through inductor L4 is never interrupted and will stay substantially in phase with the line voltage. As illustrated in FIG. 4, the ripple on the inductor current indicates the periodic charging and discharging of inductor L4 caused by the cycling of switching device 20. It will be appreciated that the ripples shown on the waveform of FIG. 4 represents a relatively slow switching frequency and in practical embodiments the ripple will be a much finer structure, since the switching cycle will be relatively fast. The higher switching frequency facilitates filtering against electromagnetic interference.

Figure 5:
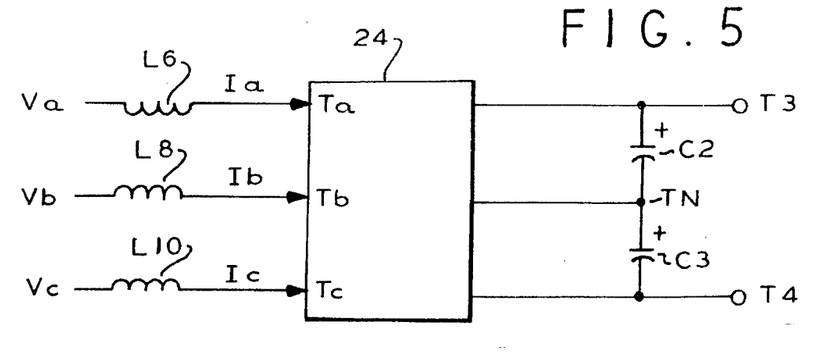
FIG. 5 is a block diagram of a three phase system using the circuitry of FIGS. 2 or 3.

Referring to FIG. 5, a three phase system is shown with multiple phases Va, Vb and Vc each serially connected with inductive devices L6, L8 and L10, to respective inputs of electronic switching circuit 24. The triple outputs of circuit 24 are shown connected to serially connected capacitors C2 and C3, at the previously mentioned output terminals T3 and T4 and the common terminal TN.

Figure 6A:
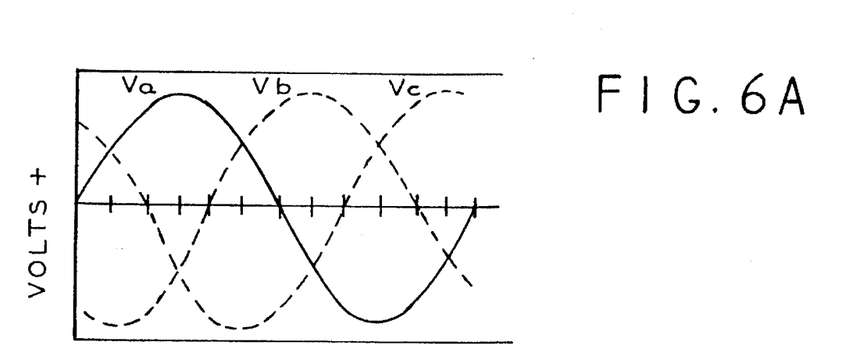
FIGS. 6A and 6B are illustrations of the current and voltage waveforms associated with the system of FIG. 5.
Figure 6B:
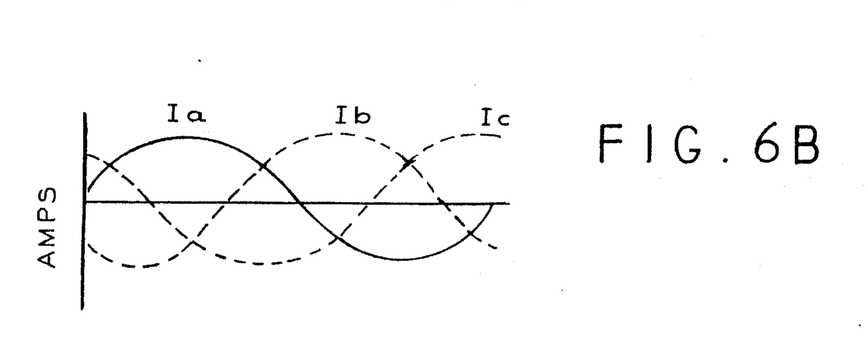

In a high power factor circuit, the phase potentials Va, Vb and Vc and phase currents Ia, Ib and Ic have the waveforms illustrated in FIGS. 6A and 6B. Significantly, each of the phase currents has the same shape as the phase voltage, without leading or lagging it.

Also the system of FIG. 5 is illustrated without a neutral. Because the phase currents Ia, Ib and Ic have the illustrated waveforms, these currents effectively cancel, so there is no need for a return current through a neutral line.

Figure 7:
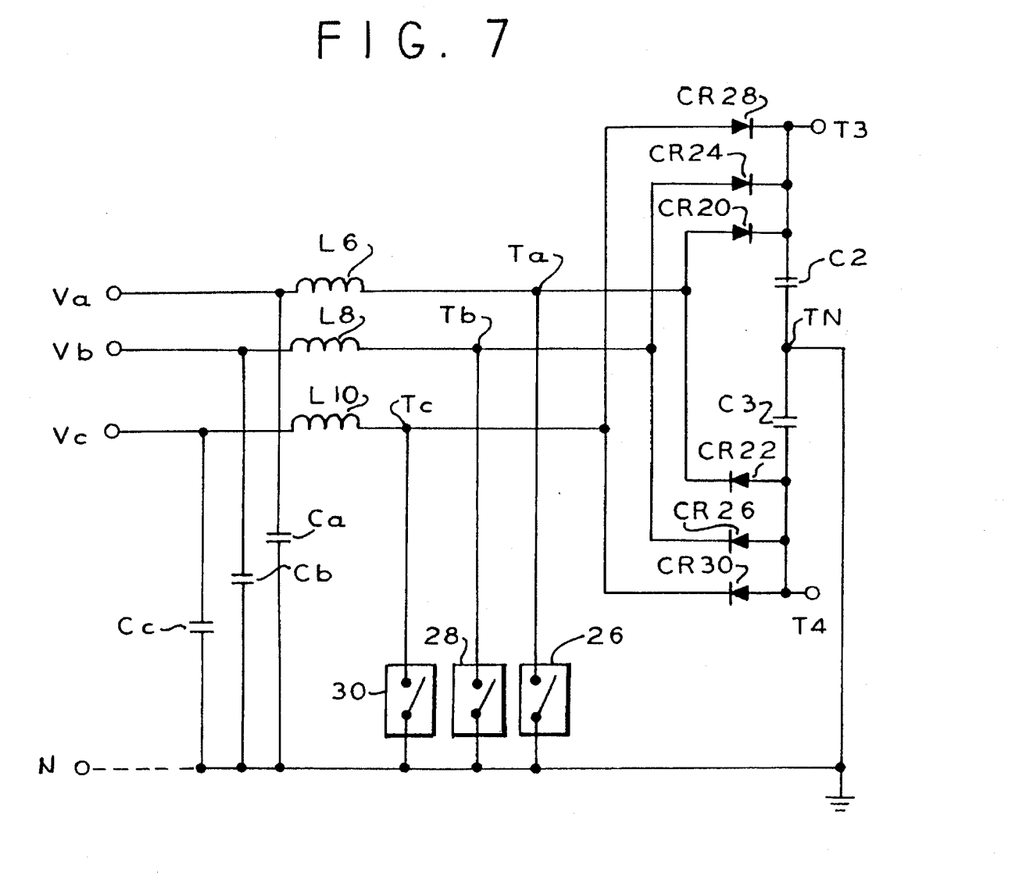
FIG. 7 is a simplified schematic diagram of one version of the three phase system of FIG. 5.

FIG. 7 is an elaboration of the block diagram of FIG. 5. Corresponding components have the same reference numerals. Inductor L6 is shown connected between terminals Va and Ta, with inductor L8 between terminals Vb and Tb, and inductor L10 between terminals Vc and Tc. (Terminals Ta, Tb and Tc are herein referred to as intermediate terminals). Each of the inductive devices L6, L8 and L10 carry bidirectional current.

Three switching devices 26, 28 and 30 are shown connected from common terminal TN (also referred to as a virtual terminal) separately to terminals Ta, Tb and Tc, respectively. As before, the energy output means is a serially connected pair of capacitors C2 and C3, joined at common terminal TN and connected in series across output terminals T3 and T4.

This system also employs three pairs of unidirectional conducting devices (providing three pairs of unidirectional conducting paths), namely: Rectifier pair CR20 and CR22, rectifier pair CR24 and CR26 and rectifier pair CR28 and CR30. Specifically, the anodes of rectifiers CR20, CR24 and CR28 are connected to terminals Ta, Tb and Tc, respectively. The cathodes of rectifiers CR22, CR26 and CR30 are connected to terminals Ta, Tb and Tc, respectively. The cathodes of rectifier CR20, CR24 and CR28 connect to terminal T3, while the anodes of rectifiers CR22, CR26 and CR30 connect to terminal T4. Buffering capacitors Ca, Cb and Cc are shown commonly connected from terminal TN, separately to lines Va, Vb and Vc, respectively.

The operation of the system of FIG. 7 is similar to the building block circuit of FIG. 3. For example, switch 26 can be operated at a relatively high frequency. As before, inductor L6 can be charged by the closure of switching device 26 to increase the magnitude of its current and magnetic energy (at least during the beginning of a half cycle of the power line). Upon the opening of switching device 26, inductor L6 reverses voltage and provides current through either rectifier CR20 or CR22 (depending upon the polarity of the current) to charge either capacitor C2 or C3, respectively. Switches 28 and 30 operate similarly with their respective inductors L8 and L10.

The return currents from this processes flow into terminal TN, either through switches 26, 28, 30 or the capacitors C2, C3. As described hereinafter terminal TN acts as a virtual or phantom neutral. For this reason actual neutral N is shown unconnected, but the dotted line indicates the possibility of a connection between terminals N and TN.

The current through the inductive devices L6, L8 and L10 will have a waveform similar to that previously shown in FIG. 6B. The three phases of current will be effectively summed at terminal TN. As is well understood, three phases of sinusoidal current displaced by 120° will cancel.

Because there are in fact perturbations on the current waveforms (for example, the ripple shown in FIG. 4) the phase currents do not cancel at terminal TN precisely. For that reason buffering capacitors Ca, Cb and Cc provide a small energy return path from terminal TN to power lines Va, Vb and Vc.

Significantly however, there need not be an actual neutral connection to terminal TN. Still, the potential at terminal TN will remain stable at approximately neutral potential. Therefore the output voltage at terminals T3 and T4 will remain stable and will not tend to generate electromagnetic interference. Moreover, because an external neutral is unnecessary, the system of FIG. 7 may work with a three phase system in either the wye or delta configuration.

Thus, terminal TN is shown marked as a ground, but this is only a virtual ground. Still, terminal TN will have a voltage that remains close to ground or neutral potential and therefore will reduce the propensity towards electromagnetic interference.

Figure 8:
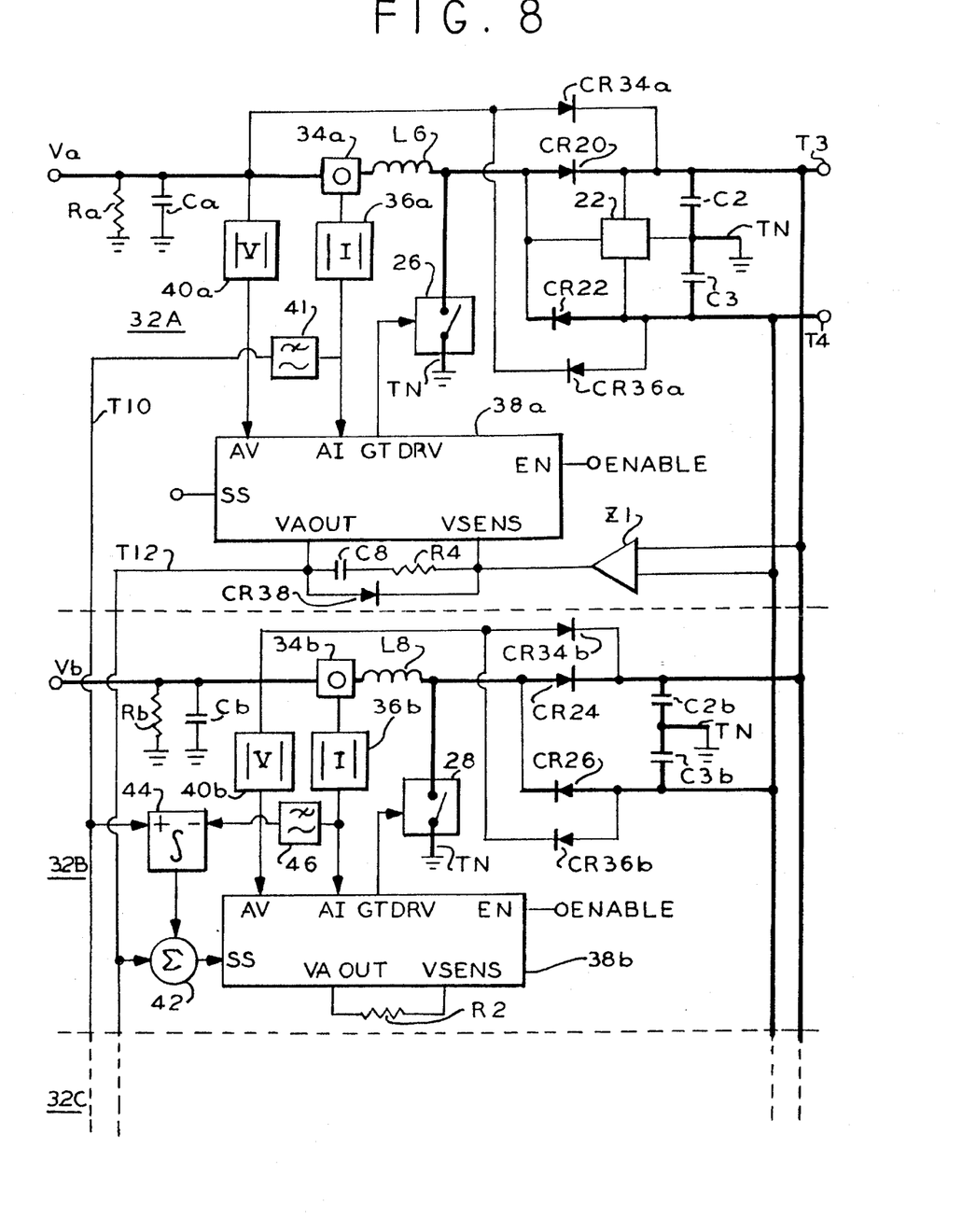
FIG. 8 is a schematic diagram elaborating more details of circuit of FIG. 7.

FIG. 8 elaborates on the previously discussed circuit schematic of FIG. 7. Corresponding components use the same reference numerals. The system is shown broken into subsystems 32A, 32B and 32C. Subsystem 32C is not specifically illustrated, but is identical to subsystem 32B. Subsystem 32C is simply connected in the same fashion as subsystem 32B to the bus lines indicated by lines T3, T4, T10 and T12.

Rectifiers CR20 and CR22 are shown connected in the same fashion as before to components C2, C3, L6 and 26. A similar connection applies in subsystem 32B to elements CR24, CR26, L8 and 28. Supplemental storage capacitors C2$b$ and C3$b$ are shown locally connected near rectifiers CR24 and CR26, but are essentially connected in parallel with capacitors C2 and C3 and thus are unnecessary in embodiments where the capacitance of capacitors C2 and C3 is adequate. Previously mentioned capacitors Ca and Cb are shown herein connected in parallel with resistors Ra and Rb, respectively.

Serially connected between terminal Va and inductive device L6 is a current sensing unit 34$a$, which may be in the form of an inductive current clamp or a Hall effect device, for sensing the magnitude of current through inductor L6. The output of the current sensing device 34$a$ is connected to current absoluting means 36, whose output connects to terminal AI of the master control means 38$a$. Absoluting means 36$a$ provides a gain of positive one for positive signals and a gain of negative one for negative signals, so that the output remains positive. Known circuits for achieving this effect are operational amplifiers using diode feedback or diode steering circuits to produce an absolute value.

The phase voltage on line Va is sensed by a voltage absoluting means 40a, whose output is connected to terminal AV of control means 38a. The absoluting means 40a employs a circuit similar to that used in absoluting means 36a.

Gate driving output GTDRV of control means 38a is shown connected to the input of switching device 26 to close and open that switch (similarly output GTDRV of slave control means 38b drives switch 28).

Rectifiers CR34a and CR36a (referred to as start up diodes) are shown with their anodes and cathodes, respectively, connected to terminal Va and their cathode and anodes, respectively, connected to terminals T3 and T4, respectively. Rectifiers CR34a and CR36a can be used to bypass surges and therefore protect switching device 26. Also these rectifiers ensure that capacitors C2 and C3 are charged to at least the peak potentials of voltage on power line Va. Rectifiers CR34b and CR36b are connected between terminals T3, T4 and Vb in a similar fashion for a similar purpose.

Referring to subsystem 32B, current sensor 34b is shown connected through current absoluting means 36b to terminal AI of control means 38b. Similarly, voltage absoluting means 40b is shown connected from line Vb to terminal AV of control means 38b. Control means 38a and 38b are identical in this embodiment, but operate differently because of the different external connections made to them.

In control means 38a input VSENS is connected to the cathode of diode CR38 and the output of differential amplifier Z1 whose differential inputs are separately connected to terminals T3 and T4 (amplifier Z1 is also referred to as an output sensing means, whose output is a common signal). Also, input VAOUT of control means 38a is connected to terminal T12 and the anode of diode CR38, which is connected in parallel with the serial combination of resistor R4 and capacitor C8.

Input terminal SS of control means 38a is shown unconnected, but for means 38b is shown connected to the summing circuit 42. Also, inputs VAOUT and VSENS of control means 38b are connected together by resistor R2. With that connection, applying a signal to terminal SS is similar to applying a signal to terminal VSENS. Voltage at terminal SS is conveyed through an internal common collector transistor (not shown) in integrated circuit Z2 (FIG. 9) to the input of a differential amplifier, whose opposite input normally receives the input of VSENS. Thus connecting resistor R2 (FIG. 8) from VSENS to VAOUT effectuates a negative feedback to allow controller 38b to handle the input at terminal SS similar to an input at terminal VSENS.

The summing inputs of summing circuit 42 are separately connected to line T12 and the output of differential integrator 44. Circuit 44 may use a differential amplifier, which drives an operational amplifier having capacitive feedback to provide the integrator effect. The non-inverting input of differential integrator 44 is connected to line T10, while its inverting input is connected to the output of low pass filter 46, whose input connects to the output of current absoluting means 36b. The output of current absoluting means 36a is also connected through a low pass filter 41 to line T10. Filters 41 and 46 may use simple R-C filters and are herein referred to as current magnitude sensors.

Figure 9:
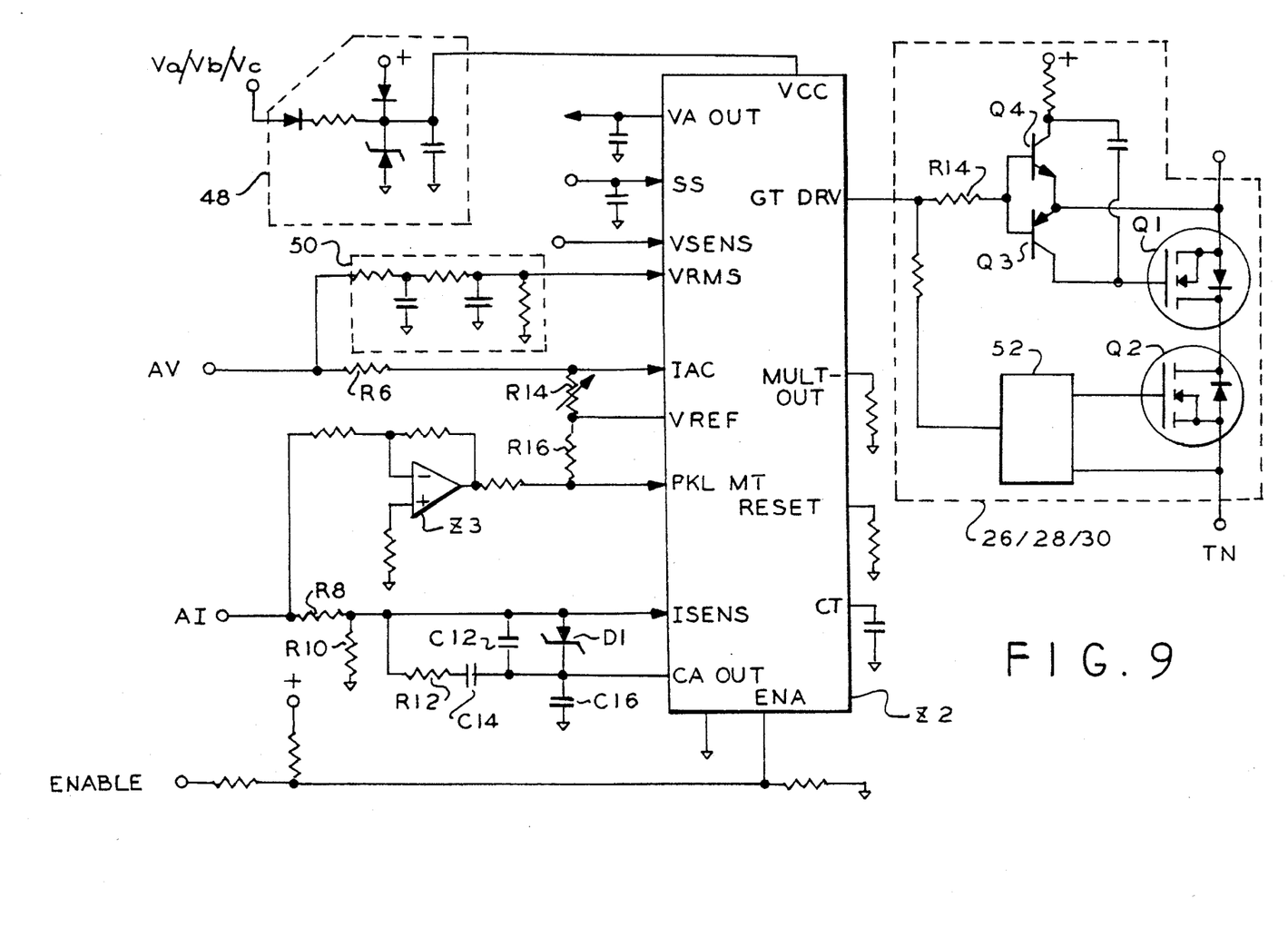
FIG. 9 is a schematic elaborating more details of the circuit of FIG. 8.

FIG. 9 shows further details on the control means, referred to in FIG. 8 as control means 38a and 38b (as well as the control means that would exist in subsystem 32C of FIG. 8). FIG. 9 also shows in further detail the switching means previously referred to as switching device 26, 28 or 30.

A central component in FIG. 9 is integrated circuit Z2, which in one constructed embodiment was a Unitrode high power factor preregulator, model number UC1854, although other integrated circuit types or discrete circuits can be employed instead. Also in some embodiments, a digital microprocessor or analog computer can be used instead.

Potential from either line Va, Vb or Vc can be applied to Zener regulated rectifier 48, to supply voltage to terminal VCC of integrated circuit Z2. Previously mentioned terminals VAOUT, SS, VSENS, and GTDRV are terminal designations used by the integrated circuit manufacturer and are illustrated herein as well. Terminals MULT-OUT, RESET, CT, and ENA are shown with appropriate terminations; either resistive, capacitive or pull-up.

The previously mentioned absoluting voltage output AV is shown connected through resistor R6 to terminal IAC of circuit Z2. Input AV is also connected through a second order filter 50 to produce a relatively constant output, closely approximating the RMS voltage on terminal AV. The output of circuit 50 is applied to terminal VRMS of circuit Z2.

The previously mentioned current absoluting signal on terminal AI is shown connected through the resistive divider R8, R10 to input ISENS of circuit Z2. Input ISENS is also connected to input CAOUT by the parallel combination of Zener diode D1, capacitor C12 and the serial combination of capacitor C14 and resistor R12. Terminal CAOUT is also capacitively grounded by capacitor C16. Input AI is also connected through inverting operational amplifier Z3 to input PKLMT of circuit Z2. Input PKLMT also connects through resistor R16 to terminal VREF. Terminal VREF connects through variable resistor R14 to terminal IAC.

Output GTDRV is shown connected to the previously mentioned switching device (either device 26, 28 or 30). The actual switching is performed by high power MOSFET transistor switches Q1 and Q2 which are connected together at their drains. Each of the transistors Q1, Q2 are shown with an integral bypassing diode. Transistors Q1 and Q2 in one embodiment were power transistor type IRFP264, although other types may be used as well. The gate of transistor Q1 is connected to the collector of transistor Q3, whose emitter connects to the source of transistor Q1 and the emitter of transistor Q4. The bases of transistor Q3 and Q4 are connected through resistor R14 to output GTDRV of integrated circuit Z2. Output GTDRV also connects through resistor R16 to the input of driver circuit 52. Circuit 52 may include an integrated driver circuit such as Unitrode model number UC1706, which is connected through an isolating transformer and full wave bridge to an appropriate transistor drive circuit (not shown), although other types of drive circuits can be used instead. The output of circuit 52 connects to the gate and source of transistor Q2.

To facilitate an understanding of the principles associated with the foregoing apparatus, its operation will be briefly described in connection with FIGS. 7, and 9. When power is initially applied through multiple phases Va, Vb, Vc, capacitor C2 and C3 (as well as capacitor C2b, C3b, etc. of FIG. 8) can be quickly charged by rectifiers CR34a and CR36a (as well as rectifiers CR34b, CR36b, etc). Each of these rectifiers provide half wave rectification to charge its respective capacitor. Initially, the voltage across terminals T3, T4 will be low and a signal indicating the low magnitude of the output voltage will be transmitted from the output of differential amplifier Z1 to terminal VSENS of control means 38a. Means 38a has an internal reference voltage within integrated circuit Z2 (FIG. 9).

The components C8, R4 and CR38 shown in FIG. 8 are effectively feedback elements around an internal operational amplifier within integrated circuit Z2 (FIG. 9). Consequently, the output on line T12 (FIG. 8) is derived from the input on terminal VSENS and constitutes an error signal (a signal related to the difference between the actual and target D.C. voltage). This voltage error signal is used by the control means 38a (and as described presently, the other control means).

This signal on input VAOUT of control means 38a (as derived from the signal on terminal VSENS) together with the absolute voltage signal AV from circuit 40a and the absolute current signal AI from circuit 36a are the primary controls of the master control means 38a.

FIG. 9 shows that the absolute voltage signal (input AV) and absolute current signal (input AI) are applied directly to inputs IAC and ISENS of integrated circuit Z2. Both are relatively high frequency signals. Also, the input on terminal VRMS is developed by second order filter 50 (RMS estimator) from the absolute voltage signal AV and is therefore a relatively low frequency signal.

Another low frequency signal is the signal on terminal VSENS, which is proportional to the D.C. output voltage of the supply. As mentioned, this measured voltage is compared to an internal reference voltage in integrated circuit Z2. Thereafter, the resulting error signal is multiplied by the instantaneous A.C. voltage measured at terminal IAC and divided by the square of the RMS voltage signal applied to terminal VRMS. This preprocessed signal therefore combines: (a) a D.C. voltage output error signal, and (b) a rescaled instantaneous line voltage signal.

This preprocessed signal is compared to the instantaneous, absolute value of line current applied to terminal ISENS of integrated circuit Z2. The latter comparison is used to adjust the average and instantaneous duty cycle of the pulses from output GTDRV of circuit Z2, which then causes transistors Q1 and Q2 to turn on and off accordingly.

The instantaneous duty cycle established by terminal GTDRV was obtained by comparing a rescaled version of the instantaneous, absolute value of line voltage to a rescaled version of the instantaneous, absolute value of line current. Accordingly, the current waveform will be varied to keep it proportional to the voltage waveform. Thus the line voltage and current will be regulated to stay in phase. Also, the average duty cycle will be adjusted to regulate the D.C. output voltage, while keeping current and voltage in phase.

The master and slave controllers 38a and 38b (FIG. 8) will have the facility to independently regulate current phasing to maintain constant D.C. output voltage. The master controller 38a, however, will also have the facility to keep the effort of the various controllers in balance as will be described presently.

In FIG. 8 the D.C. output voltage signal on line T12 is applied through summing circuit 42 to input SS of control means 38b. As mentioned before, a follower configuration is achieved with the feedback between terminals VSENS and VAOUT, so that terminal SS acts as the input of a voltage follower and produces an effect similar to connecting to terminal VSENS but without a comparison and with unity gain. Therefore, control means 38b obtains its D.C. voltage error signal from the comparison made in control means 38a.

The line currents in different phases are also compared. In particular, the absolute value of line current from line Vb, as measured by absoluting circuit 36b, is passed through a low pass (averaging) filter 46a and is applied to the inverting terminal of differential integrator 44. The non-inverting terminal of circuit 44 is driven by the output of low pass filter 44, whose input is driven by the absolute value of current on line Va.

Consequently, the average duty cycle of the regulating switch 28 (as well as switch 30 of FIG. 7) will vary in accordance the output of summing circuit 42 (FIG. 8). The output of summing circuit 42 will respond to: (a) the output voltage on terminals T3 and T4 as measured on line T12, and (b) the integrated comparison of the average absolute value of currents on lines Va and Vb (or lines Va and Vc for subsystem 32C of FIG. 8). Thus the signal applied from summing circuit 42 is the D.C. output voltage error modified by an another error signal indicating the disparity in driving current between the slave controller 38b and the master controller 38a.

In a manner described previously, the switches, such as switch 26, will be periodically closed to apply the line voltage through an inductor. For example, the line voltage on line Va will be applied across inductor L6 (FIG. 8) when switch 26 closes. When switch 26 later opens, the line voltage plus the voltage on inductor L6 will drive current through either rectifier CR20 or CR22 to charge either capacitor C2 or C3, respectively.

Balancing means 22 will operate on every other half cycle of switch 26 to increase the charge on the capacitor which was not charged in the prior switch half cycle. It will be appreciated that balancing means 22 can be connected in other positions, such as around rectifier CR24 and CR26, either as an alternate location or as a supplemental location to assist in balancing the capacitors.

It is to be appreciated that various modifications may be implemented with respect to the above described preferred embodiments. For example, the specific control scheme implemented by the controllers can be varied depending upon the desired degree of regulation and input current shaping. Also various power switches can be used to boost the voltage in each phase, in place of the illustrated MOSFET's. Moreover, the nominal repetition rates and duty cycles of the power switches can be altered depending upon the system requirements. In addition, the various control rectifiers can be replaced with switches that are timed in various fashions to provide a substantially unidirectional current (although in practical embodiments the unidirectionality need not be perfect just substantial). Furthermore, in some embodiments, the illustrated capacitors can be supplied with current pulses through an intervening transformer, possibly having a tapped primary, to provide isolation for the output voltage, which then can be referred to any desired reference potential. Also, the multi-phase power applied to the system can operate with or without a neutral line. Additionally, the various components can have values and ratings designed to provide the desired stability, speed, accuracy, capacity, power handling, ability, etc.

Obviously, many modifications and variations of the present invention are possible in light of the above teachings. It is therefore to be understood that within the scope of the appended claims, the invention may be practiced otherwise than as specifically described.

I claim:

1. A power supply adapted to be connected to a power main providing alternating current, for delivering power to a load, comprising:

energy output means for conveying electrical energy to said load;

inductive means adapted to be coupled to said power main for inductively storing and discharging energy;

a unidirectional means having a pair of unidirectional conducting paths coupled between said inductive means and said energy output means for steering bidirectional current from said inductive means to provide a unipolar potential at said energy output means;

switching means coupled to said inductive means (a) for branching away from said pair of unidirectional conducting paths, and (b) for switching a flow of bidirectional current through said inductive means to alternately (i) store energy from said power main in said inductive means, and (ii) convey energy from said inductive means and said power main to said energy output means; and control means coupled to said switching means for operating it at a repetition rate exceeding that of half cycles of said power main, said switching means having a duty cycle that is varied by said control means in a direction tending to keep current from said power main in phase with voltage on said power main.

2. A power supply according to claim 1 wherein said energy output means is operable to store energy and to deliver stored energy to said load.

3. A power supply according to claim 2 wherein said switching means is operable to switch currents without interrupting current flow from said power main, so that the power factor of the power supply is not degraded by current interruption.

4. A power supply according to claim 1 wherein said energy output means having a terminal at a voltage differing from the average voltage at said power main by an approximately constant amount.

5. A power supply according to claim 4 wherein said switching means is operable to switch currents without interrupting current flow from said power main, so that interference is not caused by current interruption.

6. A power supply according to claim 2 wherein said switching means is operable with said inductive means to boost voltage with respect to said power main.

7. A power supply according to claim 6 wherein said switching means is operable to boost two voltages of opposite polarities, each through different ones of said unidirectional conducting paths.

8. A power supply according to claim 7 wherein said two voltages of opposite polarities are constructively applied serially across said energy output means.

9. A power supply according to claim 6 wherein said switching means, by opening, is operable to serially direct current from said power main to said energy output means and to cause a discharge of energy in said inductive means.

10. A power supply according to claim 9 wherein said switching means is operable to switch currents without interrupting current flow from said power main, so that interference is not caused by current interruption at said power main.

11. A power supply according to claim 2 wherein said unidirectional means is operable to conduct current through said unidirectional conducting paths separately to different terminals of said energy output means.

12. A power supply according to claim 11 wherein said unidirectional conducting paths each conduct substantially for different half waves of said power main.

13. A power supply according to claim 2 wherein said energy output means has a pair of output terminals and wherein said unidirectional means comprises:

a pair of unidirectional conducting devices each connected from a different corresponding one of said output terminals to said inductive means.

14. A power supply according to claim 13 wherein said energy output means comprises:

a pair of capacitive devices serially connected together at a common terminal, said switching means being connected between said common terminal and said inductive means.

15. A power supply according to claim 14 comprising:

balancing means for (a) storing balancing energy when one of said capacitive devices is being charged, and (b) subsequently charging the other one of said capacitive devices using said balancing energy.

16. A power supply according to claim 15 wherein said balancing means comprises:

a steering circuit having a pair of capacitors each coupled to said energy output means for transferring a charge associated with one of said capacitive devices to another one of said capacitive devices.

17. A power supply according to claim 2 wherein said inductive means has a pair of inductor terminals and wherein said unidirectional means comprises:

a pair of unidirectional conducting devices each connected from a different corresponding one of said inductor terminals to separate terminals on said energy output means.

18. A power supply according to claim 2 wherein said inductive means has an inductor with a pair of inductor terminals and wherein said unidirectional means comprises:

a pair of unidirectional conducting devices each connected from a common one of said inductor terminals to separate terminals on said energy output means.

19. A power supply according to claim 18 wherein said switching means comprises:

a switching device connected between said common one of said inductor terminals and said energy output means.

20. A power supply according to claim 17 wherein said inductive means comprises:

a pair of inductive devices each serially connected to a different corresponding one of said unidirectional conducting devices.

21. A power supply according to claim 17 wherein said switching means comprises:

a pair of switching devices each being connected to a different corresponding one of said unidirectional conducting devices.

22. A power supply according to claim 2 comprising:

a current absoluting means coupled to said power main for producing and applying to said control means a current signal signifying the absolute value of current from said power main.

23. A power supply according to claim 22 comprising:

a voltage absoluting means coupled to said power main for producing and applying to said control means a voltage signal signifying the absolute value of voltage at said power main.

24. A power supply according to claim 12 comprising:

a pair of start-up diodes each connected from said power main to separate terminals on said energy output means.

25. A power supply according to claim 1 wherein said power main has multiple phases, said inductive means having a plurality of inductive devices, at least one for each of said multiple phases, said switching means having a plurality of switching devices, at least one for each of said multiple phases, each of said switching devices being coupled to a different corresponding one of said inductive devices for switching therethrough a flow of bidirectional current to alternately (a) store energy in said inductive means from an associated one of said multiple phases of said power main, and (b) convey energy from said inductive means and said associated one of said multiple phases of said power main to said energy output means.

26. A power supply according to claim 25 wherein said unidirectional means has a plurality of pairs of unidirectional conducting paths, each pair being coupled between a different affiliated one of said inductive devices and said energy output means for steering thereto bidirectional current from said inductive means to provide a unipolar potential at said energy output means.

27. A power supply according to claim 26 wherein said control means comprises a plurality of controllers, one for each of said multiple phases of said power main, each of said controllers being coupled to a different related one of said switching devices for operating it at a repetition rate exceeding that of half cycles of said power main, said supply comprising:

output sensing means coupled to each of said controllers and to said energy output means for commonly providing to each of said controllers a common signal signifying the voltage across said energy output means.

28. A power supply according to claim 27 wherein each of said switching devices has a duty cycle that is varied by said control means in a direction tending to keep current from each of said multiple phases of said power main in phase with voltage on said power main.

29. A power supply according to claim 28 comprising:

a plurality of current magnitude sensors separately coupled to different ones of said multiple phases of said power main to provide a plurality of current magnitude signals signifying currents from said power main, all but a predetermined one of said current magnitude sensors being separately connected to all but a pre-established one of said controllers, said predetermined one of said current magnitude sensors being connected to all but said pre-established one of said controllers, all but said pre-established one of said controllers being regulated as a function of the difference between said current magnitude signals at the controller.

30. A power supply according to claim 29 comprising:

a plurality of a current absoluting means, one for each of said multiple phases, each of said current absoluting means being coupled to a different one of said multiple phases of said power main for producing and applying to a correlated one of said controllers a current signal signifying the absolute value of current from said power main.

31. A power supply according to claim 25 wherein said energy output means has a virtual terminal, each of said switching devices being connected from said virtual terminal to a different one of said inductive devices, each of said switching devices having a duty cycle that is varied by said control means in a direction tending to minimize net current into said virtual terminal.

32. A power supply according to claim 27 comprising:

a plurality of a current absoluting means, one for each of said multiple phases, each of said current absoluting means being coupled to a different one of said multiple phases of said power main for producing and applying to a correlated one of said controllers a current signal signifying the absolute value of current from said power main.

33. A power supply according to claim 32 comprising:

a plurality of voltage absoluting means, one for each of said multiple phases, each of said voltage absoluting means being coupled to a different one of said multiple phases said power main for producing and applying to said correlated one of said controllers a voltage signal signifying the absolute value of voltage from one of said multiple phases of said power main.

34. A power supply according to claim 27 wherein said energy output means has a pair of output terminals and a common terminal, each of said switching devices being connected from said common terminal to a different one of a plurality of intermediate terminals, each of said inductive devices being connected from a different one of said intermediate terminals to a correlated one of said multiple phases of said power main, said unidirectional means including a plurality of pairs of unidirectional conducting devices, for each pair both of said unidirectional conducting devices being connected from (a) a common connection at a corresponding one of said intermediate terminals, to (b) a separate connection at different ones of the pair of output terminals of said energy output means.

35. A power supply according to claim 25 wherein said energy output means is operable to store energy and to deliver stored energy to said load.

36. A power supply according to claim 35 wherein said switching means is operable to switch currents without interrupting current flow from each of the multiple phases of said power main, so that the power factor of the power supply is not degraded by current interruption.

37. A power supply according to claim 36 wherein each of the switching devices has duty cycle that is varied by said control means in a direction tending to keep current from each of the multiple phases of said power main in phase with voltage of said power main.

38. A power supply according to claim 35 wherein each of said switching devices is operable with said inductive means to boost voltage with respect to said power main.

39. A power supply according to claim 38 wherein said unidirectional means has a plurality of pairs of unidirectional conducting paths, each pair being coupled between a different affiliated one of said inductive devices and said energy output means for steering thereto bidirectional current from said inductive means to provide a unipolar potential at said energy output means, each of said switching devices being operable through different pairs of said unidirectional conducting paths to boost two voltages of opposite polarities.

40. A power supply according to claim 35 wherein each of said switching devices, by opening, is operable to serially direct current from said power main to said energy output means and to cause a discharge of energy in said inductive means.

41. A power supply according to claim 39 wherein each of said unidirectional conducting paths in each pair conduct substantially for different half waves of one of the multiple phases of said power main.

42. A power supply according to claim 25 wherein said energy output means comprises:

a pair of capacitive devices serially connected together at a common terminal, each of said switching devices being connected between said common terminal and said inductive means.

43. A power supply according to claim 42 comprising:

balancing means for (a) storing balancing energy when one of said capacitors is being charged, and (b) subsequently charging the other one of said capacitors using said balancing energy.

44. A power supply adapted to be connected to a power main providing alternating current, for delivering power to a load, comprising:
- a pair of capacitive devices serially connected across a pair of output terminals and connected together at a common terminal for storing and conveying electrical energy to said load;
- inductive means adapted to be coupled to said power main for inductively storing and discharging energy;
- a pair of unidirectional conducting devices each connected from a different corresponding one of said output terminals to said inductive means;
- switching means coupled to said inductive means and being connected between said common terminal and said inductive means; and
- control means coupled to said switching means for operating it at a repetition rate exceeding that of half cycles of said power main, said switching means having a duty cycle that is varied by said control means in a direction tending to keep current from said power main in phase with voltage on said power main.

45. A power supply according to claim 44 wherein said inductive means comprises:
- an inductive device having an intermediate terminal, said unidirectional conducting devices each being connected from said intermediate terminal to a different one of said output terminals, said switching means being connected between said common terminal and said intermediate terminal.

46. A power supply adapted to be connected to a power main having multiple phases, for delivering power to a load, comprising:
- a pair of capacitive devices being serially connected across a pair of output terminals and connected together at a common terminal for storing and conveying electrical energy to said load;
- a plurality of inductive devices, one for each of said multiple phases of said power main, each of said inductive devices being adapted to be separately coupled to a corresponding one of said multiple phases of said power main for inductively storing and discharging energy;
- a plurality of pairs of unidirectional conducting devices, one pair for each of said multiple phases of said power main, each of said unidirectional conducting devices of each pair being connected from a related one of said output terminals to an associated one of said inductive devices;
- a plurality of switching devices, one for each of said multiple phases of said power main, each of said switching devices being coupled from said common terminal to an affiliated one of said inductive devices; and
- control means coupled to each of said switching devices for operating them at a repetition rate exceeding that of half cycles of said power main, said switching means having a duty cycle that is varied by said control means in a direction tending to keep current from said power main in phase with voltage on said power main.

47. A power supply according to claim 46 wherein each of said inductive devices having an intermediate terminal, each of the unidirectional conducting devices of each pair being connected from a one of said output terminals to the intermediate terminal of one of said inductive devices, each of said switching devices being connected from said common terminal to the intermediate terminal of a different respective one of said inductive devices.

* * * * *